(12) United States Patent
Roozeboom

(10) Patent No.: US 11,698,325 B1
(45) Date of Patent: Jul. 11, 2023

(54) SYSTEM AND METHOD FOR USING PRESSURE-SENSITIVE PAINT (PSP) TO ANALYZE UNSTEADY AERODYNAMIC LOADS ON VEHICLES

(71) Applicant: United States of America as Represented by the Administrator of NASA, Washington, DC (US)

(72) Inventor: Nettie Halcomb Roozeboom, Mountain View, CA (US)

(73) Assignee: United States of America as Represented by the Administrator of NASA, Washington, DC (US)

( * ) Notice: Subject to any disclaimer, the term of this patent is extended or adjusted under 35 U.S.C. 154(b) by 266 days.

(21) Appl. No.: 16/914,467

(22) Filed: Jun. 28, 2020

Related U.S. Application Data

(60) Provisional application No. 62/868,823, filed on Jun. 28, 2019.

(51) Int. Cl.
G01M 9/04 (2006.01)
G01L 27/00 (2006.01)
G01L 11/02 (2006.01)

(52) U.S. Cl.
CPC ............. *G01M 9/04* (2013.01); *G01L 11/02* (2013.01); *G01L 27/002* (2013.01)

(58) Field of Classification Search
CPC .................................. G01M 9/04; G01L 11/02
See application file for complete search history.

(56) References Cited

U.S. PATENT DOCUMENTS 5,307,675 A * 5/1994 Mosharov ............... G01M 9/06
                                                    73/705
5,731,995 A * 3/1998 Benne .................... G01M 9/06
                                                    73/147

(Continued)

FOREIGN PATENT DOCUMENTS

WO    WO-2005045385 A2 * 5/2005 ............... G01L 1/24

OTHER PUBLICATIONS

Sellars, Evaluation of Unsteady Pressure Sensitive Paint Measurement Technique for Space Launch Vehicle Buffet Determination, Jan. 2017, AIAA SciTech Forum, 55th AIAA Aerospace Science Meeting, pp. 1-34 (Year: 2017).*

(Continued)

*Primary Examiner* — Francis C Gray
(74) *Attorney, Agent, or Firm* — Rhys W. Cheung; Robert M. Padilla; Trenton J. Roche

(57) ABSTRACT

A method for measuring and computing unsteady loads using unsteady pressure-sensitive paint (uPSP) data includes performing an in-situ calibration using an average of pixels of a portion of an image captured of a surface painted with pressure-sensitive paint. The method also includes dividing an average static pressure by an intensity for each region of interest (ROI) in terms of time to produce a ratioed intensity measuring an intensity fluctuation. The method further includes producing a pressure-time history from the in-situ calibration and the measured intensity fluctuation. The method also includes calculating a fluctuating force by multiplying the produced pressure-time history by an area of pixels in each ROI, and converting a time signal to a frequency, and producing a power spectral density (PSD) to compare frequency content to determine an amount of energy at a certain frequency band.

15 Claims, 14 Drawing Sheets

(56) References Cited

U.S. PATENT DOCUMENTS

| | | | |
|---|---|---|---|
| H2127 H * | 10/2005 | Byrd | 374/121 |
| 2005/0143938 A1* | 6/2005 | Schulze | G01M 9/062 |
| | | | 702/42 |
| 2020/0011995 A1* | 1/2020 | Send | G01S 17/42 |

OTHER PUBLICATIONS

DM Schuster, J Panda, JC Ross, NH Roozeboom . . . -2016-, Investigation of Unsteady Pressure-Sensitive Paint (uPSP) and a Dynamic Loads Balance to Predict Launch Vehicle Buffet Environments 2016, ntrs.nasa.gov, NASA/TM 2016-219352 NESC-RP-14-00962, 2016.*

* cited by examiner

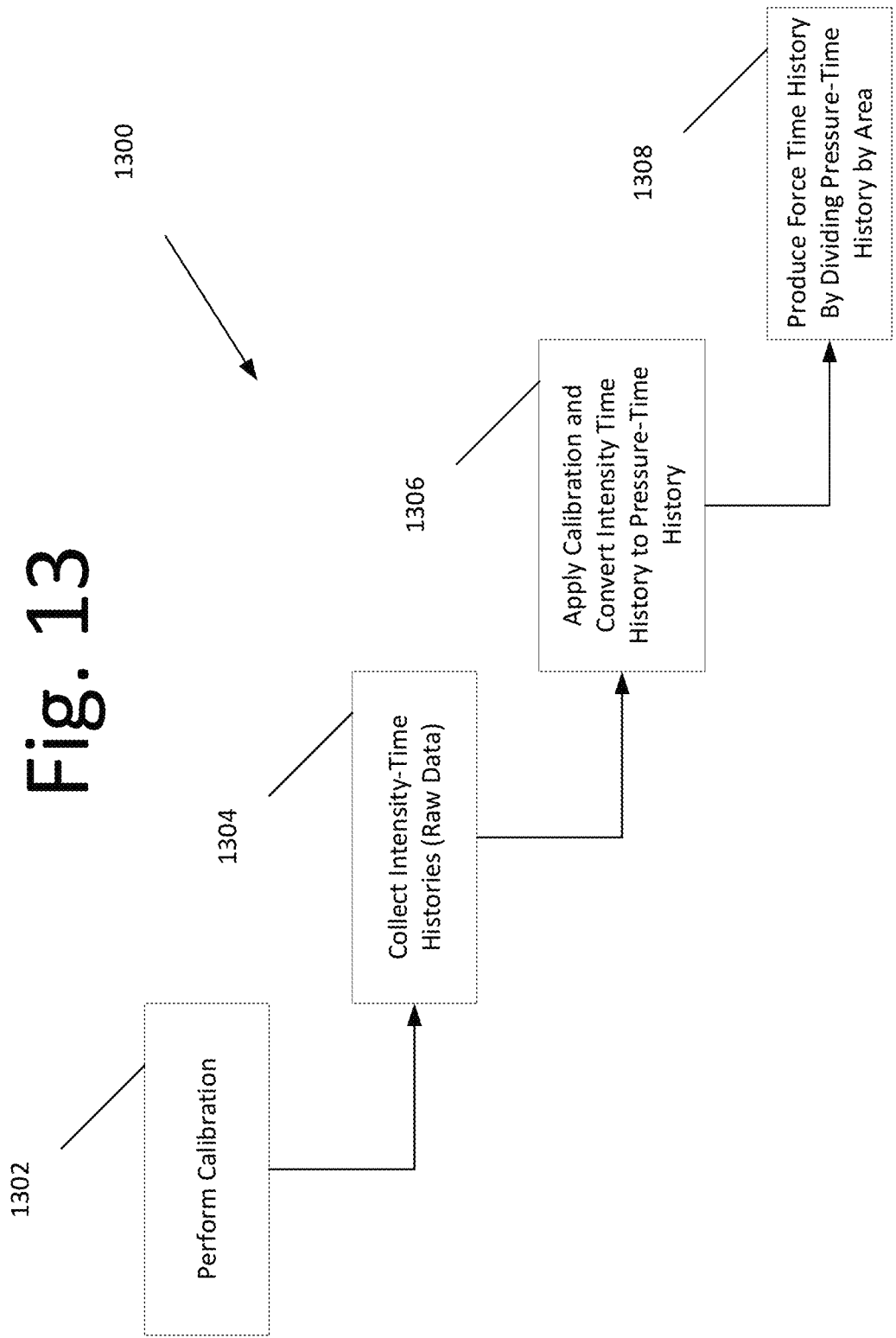

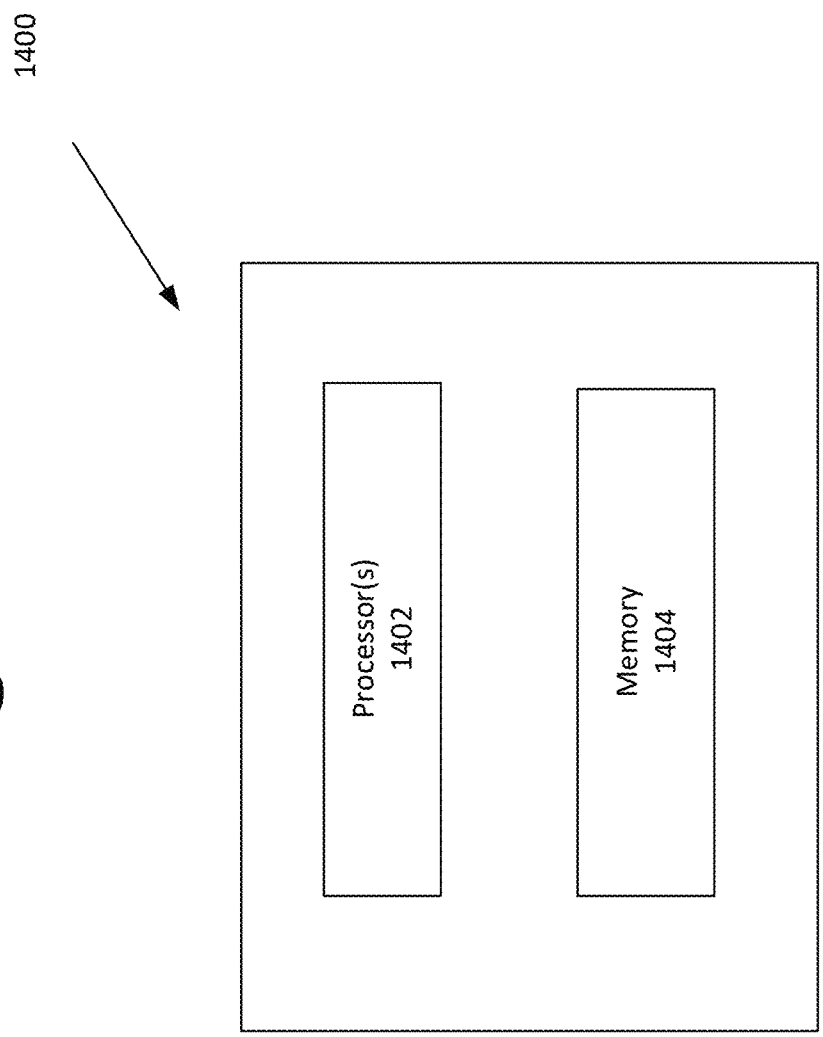

SYSTEM AND METHOD FOR USING PRESSURE-SENSITIVE PAINT (PSP) TO ANALYZE UNSTEADY AERODYNAMIC LOADS ON VEHICLES

CROSS-REFERENCE TO RELATED APPLICATION

This application claims the benefit of U.S. Provisional Patent Application No. 62/868,823 filed Jun. 28, 2019. The subject matter of this earlier filed application is hereby incorporated by reference in its entirety.

ORIGIN OF THE INVENTION

The invention described herein was made by employees of the United States Government and may be manufactured and used by or for the Government of the United States of America for governmental purposes without the payment of any royalties thereon or therefore.

FIELD

The present invention generally pertains to analyzing unsteady aerodynamic loads on vehicles, and more particularly, using PSP to analyze the unsteady aerodynamic loads.

BACKGROUND

Many important physical problems in aerosciences involve unsteady, separated flows. The ability to measure and compute these flows has been a persistent challenge. Unsteady aerodynamics leads to unsteady loads, which ultimately decrease system performance and shortens the system's lifespan.

Traditionally, unsteady pressure transducers have been the instrumentation of choice for investigating unsteady flow phenomena. For wind tunnel tests acquiring high frequency pressure environment data, the common practice is to install hundreds of unsteady pressure transducers. Often 200 to 300 transducers are used for integrating pressure fluctuations over a specified area. This practice becomes a large monetary and time expense for the customer. An average cost is approximately $2,000 per transducer. This includes the instrument, machining of the holes for the instrument, and machining of the model once the instrument screen is installed to create a smooth model surface. However, other costs include the calibration of each transducer, installation, and inspection after installation in the wind tunnel. Even with the high transducer count, the data collected is still sparse and coverage is insufficient to provide accurate integrated unsteady loads on a wind tunnel model.

Results using only the pressure transducers are prone to inaccuracies, providing overly conservative load predictions in some cases and underestimating load predictions in other areas depending on the flow characteristics.

An improved approach without such disadvantages is desirable.

SUMMARY

Certain embodiments of the present invention may provide solutions to the problems and needs in the art that have not yet been fully identified, appreciated, or solved by conventional aerodynamic loading testing technologies. For example, some embodiments of the present invention pertain to a method that uses PSP to analyze the unsteady aerodynamic loads. With recent advances in high-speed cameras, high-powered energy sources, and faster response pressure-sensitive paint, the unsteady PSP (uPSP) technique is tool to investigate this critical flow. This technique enables time-resolved measurements of unsteady pressure fluctuations within a dense grid of spatial points representing the wind tunnel model.

Since uPSP is applied by a spray gun, it is continuously distributed. Also, if the model geometry can be painted, viewed from a camera, and excited by a lamp source, conceivably uPSP data can be collected. Unsteady PSP (uPSP) has the ability to determine more accurate integrated unsteady loads. See, for example, FIG. 1, which is an image 100 illustrating a raw uPSP image with raw shadowgraph image showing an oscillating shock. The pressure transducers locations noted by the black circles indicate that the flow phenomena is just downstream of the instrumentation. This is not surprising, since the flow features change with the varying wind tunnel conditions and pressure transducers cannot be installed to capture every flow feature at every wind tunnel condition. This is highly advantageous and very attractive when investigating unsteady aerodynamics. Accordingly, this improved approach that analyzes the unsteady aerodynamic loads with uPSP is beneficial.

In some embodiments, a method for investigating a fundamental application of uPSP includes performing an in-situ calibration using an average of pixels. The method also includes dividing an average static pressure by an intensity for each region of interest (ROI) in terms of time to produce a ratioed intensity measuring an intensity fluctuation. The method further includes producing a pressure-time history from the in-situ calibration and the measured intensity fluctuation. The method also includes calculating a fluctuating force by multiplying the produced pressure-time history by an area of pixels in each ROI, and converting a time signal to a frequency and a power spectral density (PSD) to compare frequency content to determine an amount of energy at a certain frequency band.

In another embodiment, an apparatus for investigating a fundamental application of uPSP includes at least one processor and memory comprising a set of instructions. The at least one processor, when executed by the set of instructions, are configured to in-situ calibrating using an average of pixels, and dividing an average static pressure by an intensity for ROI in terms of time to produce a ratioed intensity measuring an intensity fluctuation. The at least one processor, when executed by the set of instructions, are further configured to perform producing a pressure-time history from the in-situ calibration and the measured intensity fluctuation, and calculating a fluctuating force by multiplying the produced pressure-time history by an area of pixels in each ROI. The at least one processor, when executed by the set of instructions, are further configured to perform converting a time signal to a frequency and a PSD to compare frequency content to determine an amount of energy at a certain frequency band.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which:

FIG. 13 is a flow diagram illustrating a method to investigate the fundamental application of uPSP, according to some embodiments of the present invention.

FIG. 14 is a block diagram illustrating an apparatus for investigating a fundamental application of uPSP, according to some embodiments of the present invention.

DETAILED DESCRIPTION OF THE EMBODIMENTS

Some embodiments of the present invention pertain to a method that uses PSP to analyze the unsteady aerodynamic loads. For example, some embodiments focus on a fundamental experiment conducted at NASA Ames Research Center's Fluid Mechanics Lab 14"×14" in-draft wind tunnel. This is a small scale facility and enables fundamental research questions to be explored. For the experiment outlined in the figures below, a 2" W×2" H×1" L block was mounted on the floor of the wind tunnel to introduce a known disturbance in the flow. The pressure disturbance introduced to the floor of the wind tunnel was measured by applying a patch of fast-response PSP. This test was conducted as a fundamental effort to understand uPSP, its application, and increased resolution to directly compute unsteady loads.

Pressure-Sensitive Paint (uPSP)

Porous, fast-response PSP was used for testing, because of the requirement to detect pressure fluctuations up to 20 kHz. The PSP's pressure sensitive component is platinum (pentafluorophenyl) porphyrin (PtTFPP) and the base is a polymer ceramic.

In this example, a 12-bit, high-speed camera (e.g., 1280× 800 pixels), with a quantum efficiency of ~50% at 650-nm PSP emission wavelength, was used in this test to record the unsteady intensity data. This unsteady intensity data was converted from intensity to pressure, producing surface pressure-time history data. It should be noted that the embodiments are not limited to the cameras described herein. In this test, for example, one high-speed camera was mounted above the test section focusing on a small section of the wind tunnel floor painted with uPSP (approximate 4"×8"). The raw image is shown in FIG. 2.

Figure 1:
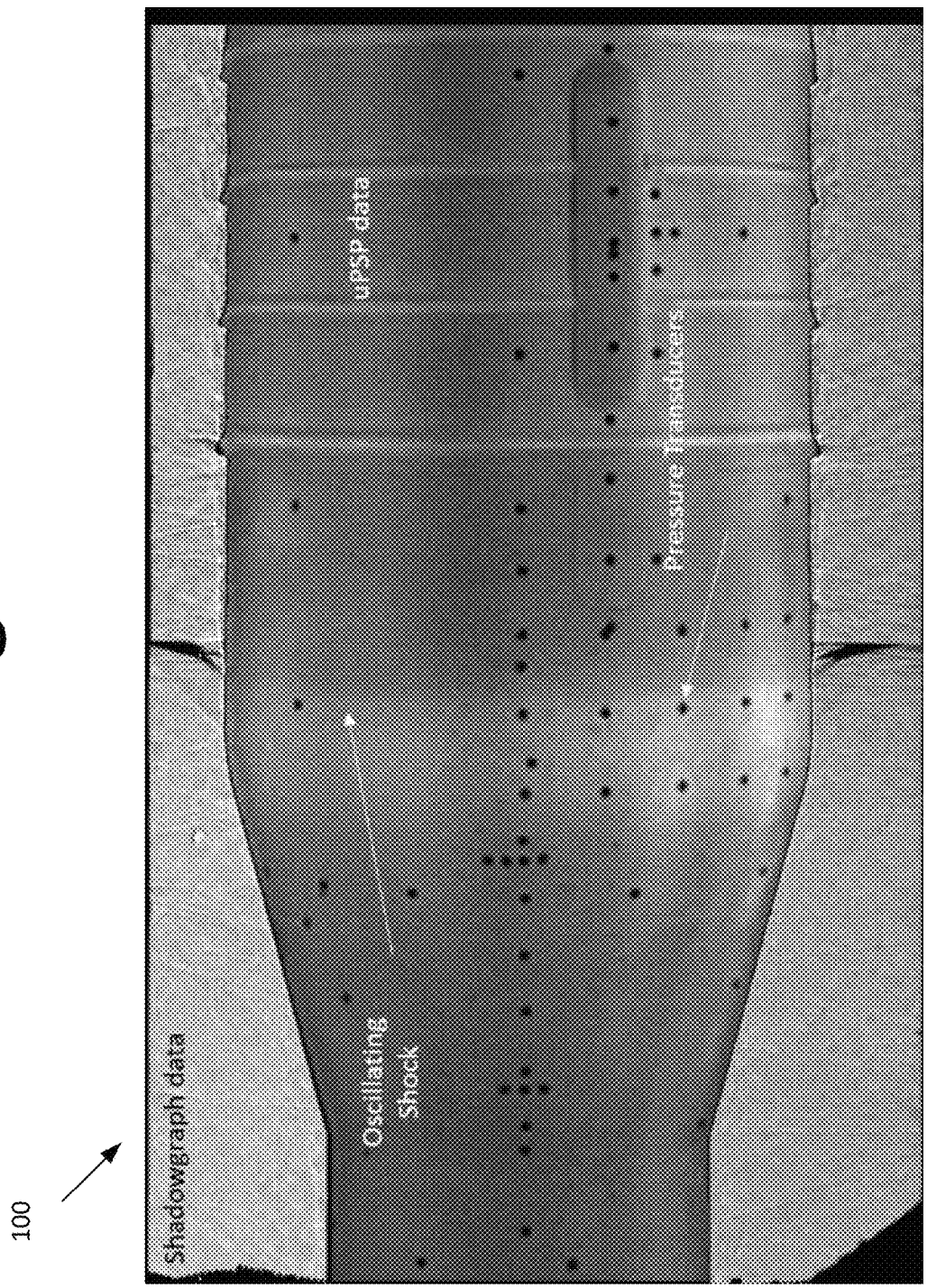
FIG. 1 is an image illustrating a raw uPSP image with a raw shadowgraph image showing an oscillating shock using a conventional approach.
Figure 2:
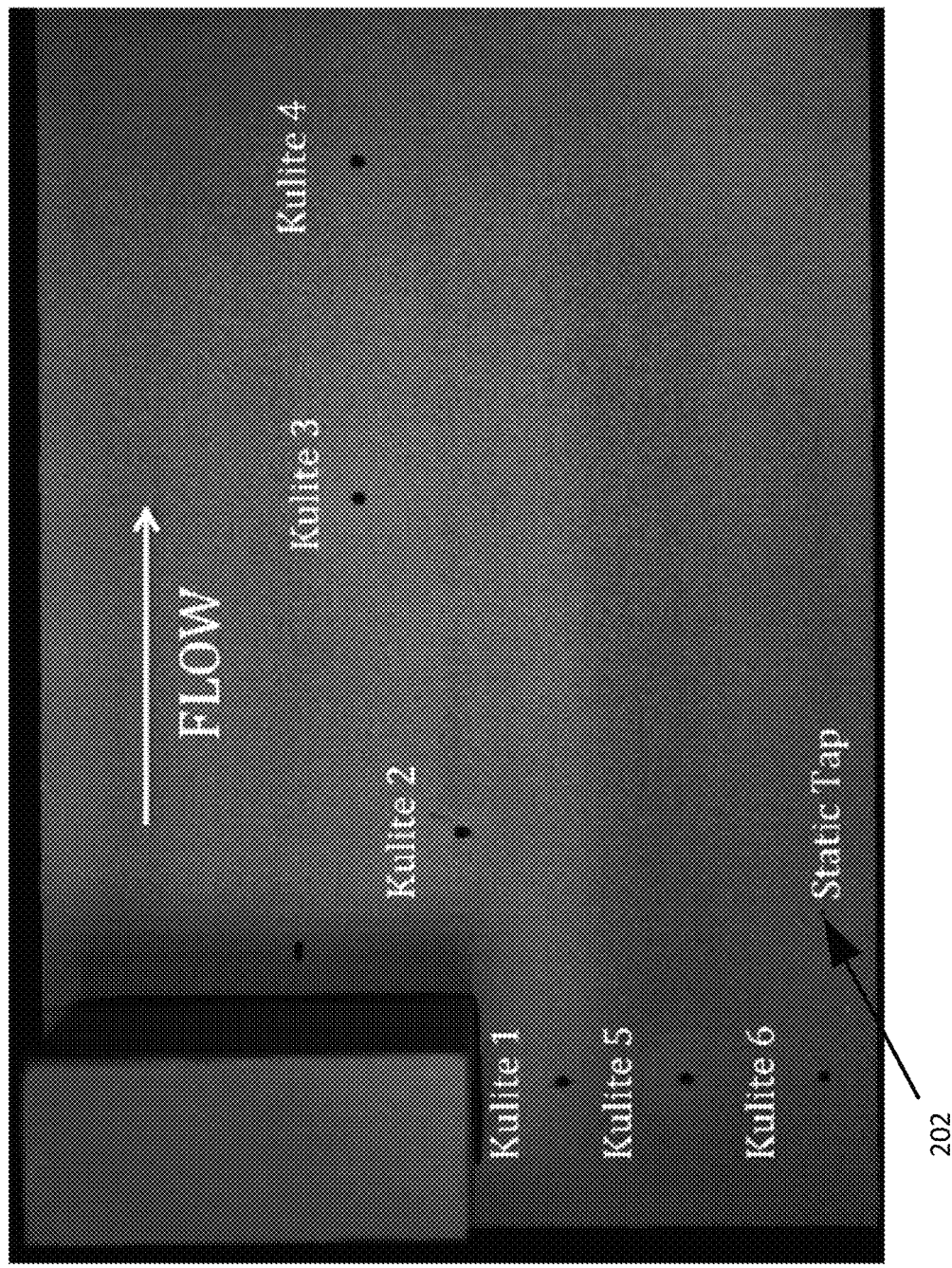
FIG. 2 is an image illustrating a capture of the block on the floor of the wind tunnel, according to some embodiments of the present invention.

FIG. 2 is an image 200 illustrating a block on the floor of the wind tunnel, according to some embodiments of the present invention. As can be seen from image 200, the block is located on the upper left hand side with the direction of the wind flow from left to right.

The location of six unsteady pressure transducers, often referred to by their brand name—Kulite, are indicated by the small black circles shown in FIG. 2. A static tap 202, used for calibration, is located in lower portion of the image by 'Kulite 6'. Although the diameter of static tap 202 is small, static tap 202 may still be viewed in image 200. Static tap 202 is an orifice that a tubing connects to for computing the static pressure.

An epoxy base coat, the polymer-ceramic fast-response PSP base coat, and an active PSP layer were applied. To reduce any damage to the pressure transducers, adhesives (see black dots near Kulites 1-6) were applied over the top of the instrument screen. After painting is complete, the mask is removed. Since a filter is used to only collect 650-nm wavelengths, the area not painted does not fluoresce, and therefore, is black. Once the masks were removed after painting, the circular contrast between bare metal and PSP is used as image registration targets if necessary. The pressure transducers (or Kulites) are identified in FIG. 2.

Two (400-nm wavelength) Light Emitting Diodes (LEDs) were installed above the test section, one on each side of the camera to introduce uniform lighting. Each LED produces ~12-14 W of power. These LEDs are used for paint excitation during uPSP data collection. The LEDs illuminated the model continuously while the uPSP system acquired data. The uPSP data and dynamic pressure transducer data were acquired at the same time.

Pressure Transducers

The priority of this test was to design a fundamental research experiment to acquire data of unsteady loads using uPSP. In this experiment, six transducers were installed; however, one failed before the experiment began.

Static Pressure Taps

A single pressure tap was installed towards the edge of the model to sense static pressure without much influence from the disturbed flow for calibration purposes. See image 200 of FIG. 2, labeled "Static Tap" 202. The static pressure was connected to a Dwyer Series 477 Digital Manometer in this experiment. Static pressure was calculated as difference between atmospheric pressure and the pressure read by the monometer unit.

uPSP Processing Development

At a high level, the uPSP processing approach begins with adjusting the camera calibrations for the first frame in the captured video using the visible model targets. The model targets in this case are the dynamic pressure transducers.

Since the camera calibrations were computed from wind-off images, this adjustment captures sting deflections for each wind-on condition. Next, a projection matrix is developed for each camera using ray tracing, and the matrices are adjusted for camera overlap. In overlapping regions, the weights of the cameras are determined by the angle between camera and the model normal. For each frame after the first, register the image to the first frame. Project the frame onto the tunnel. Convert image intensity to pressure.

Figure 3:
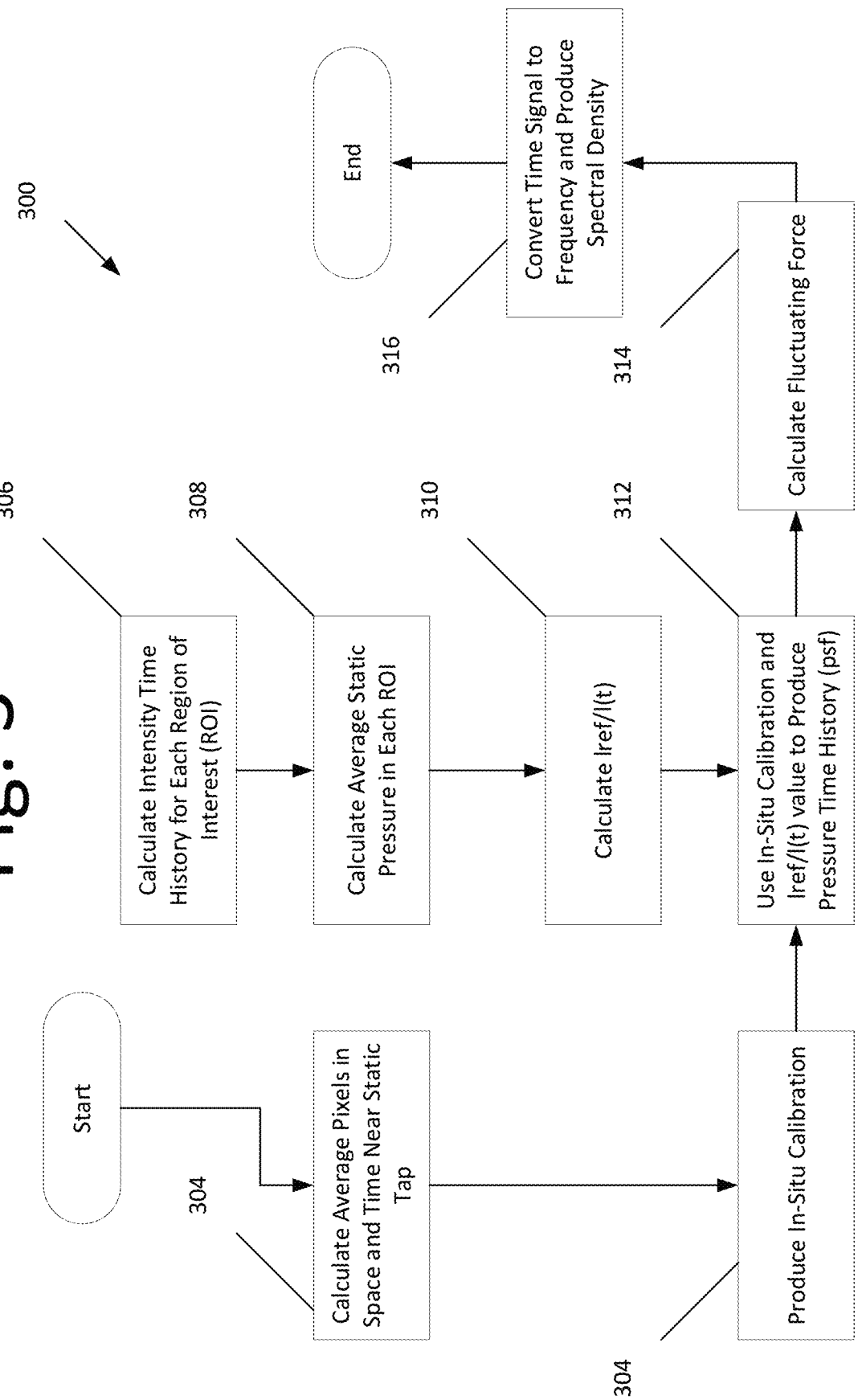
FIG. 3 is a flow diagram illustrating a uPSP processing method to investigate the fundamental application of uPSP, according to some embodiments of the present invention.

FIG. 3 is a flow diagram illustrating a uPSP processing method 300 to investigate the fundamental application of uPSP, according to an embodiment of the present invention. This method 300 calculates unsteady loads using the paint response and known area of the model.

Figure 4:
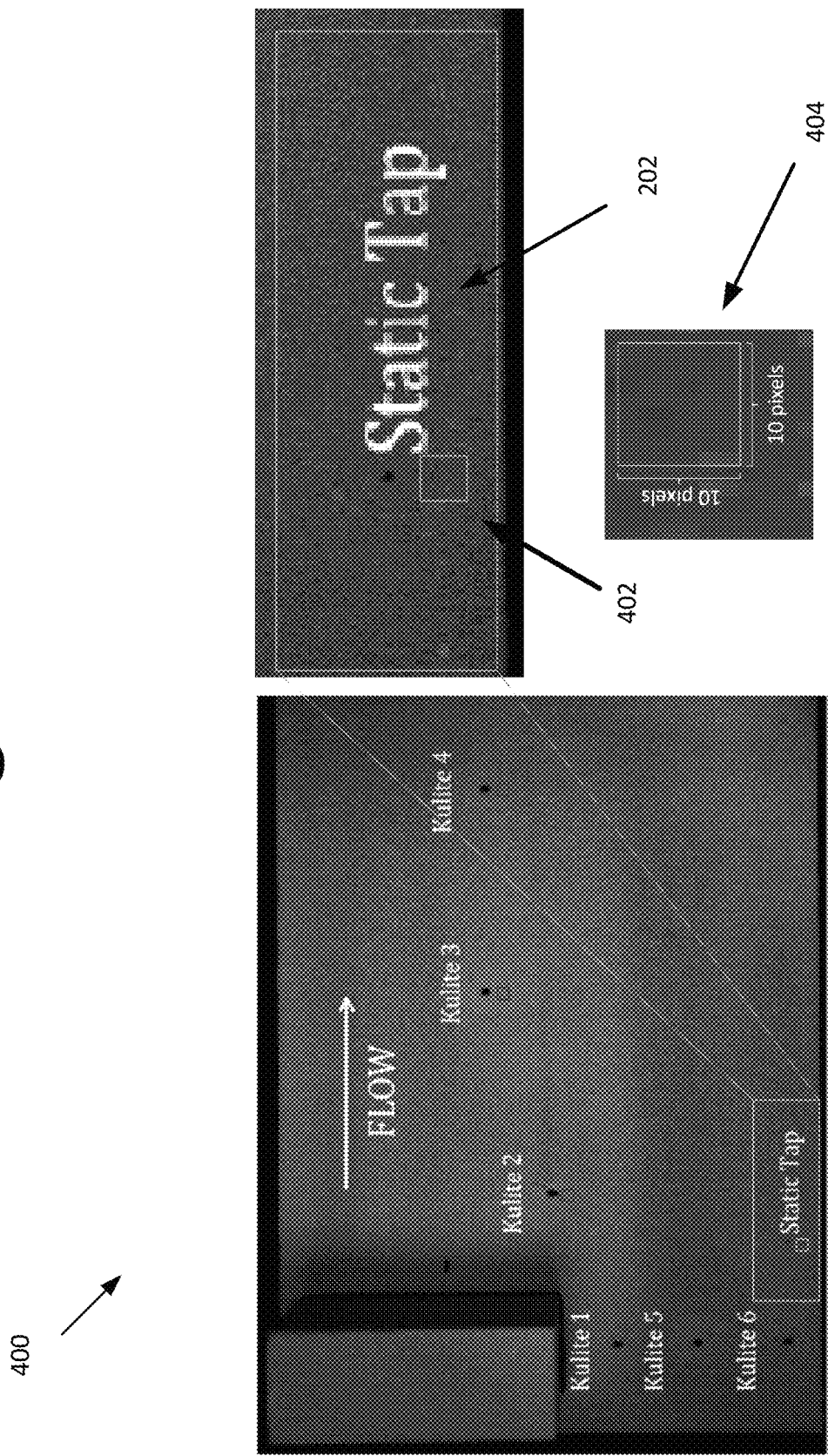
FIG. 4 is an image showing the average of pixels in space and time at a location near static tap, according to some embodiments of the present invention.

In some embodiments, method 300 may begin at 302 with calculating the averaged light intensity of a set of pixels, or an average of pixels, in space and time at a location near the static tap. FIG. 4 is an image 400 showing the average of pixels in space and time at a location 402 near static tap 202, according to an embodiment of the present invention. In image 400, at location 402 near static tap 402, the total number of pixels averaged in this example is 10 pixels×10 pixels. See box 404.

To calculate the average of pixels, some embodiments use the following equation.

$$I_{static} = \sum_{p=1}^{m}\sum_{t=1}^{n} I_{p,t} \qquad \text{Equation (1)}$$

where p is the pixel number, m is the total number of pixels averaged (e.g., 10×10=100), t is the time frame, and n is the total number of frames (varied). For this work, the images (representing each pixel as a count from 0-4095 (12-bit)) were digitized, and MATLAB® was used to extract pixel locations and the pixel value at that location. It should be noted, however, that tool does not have to be MATLAB®.

Figure 5:
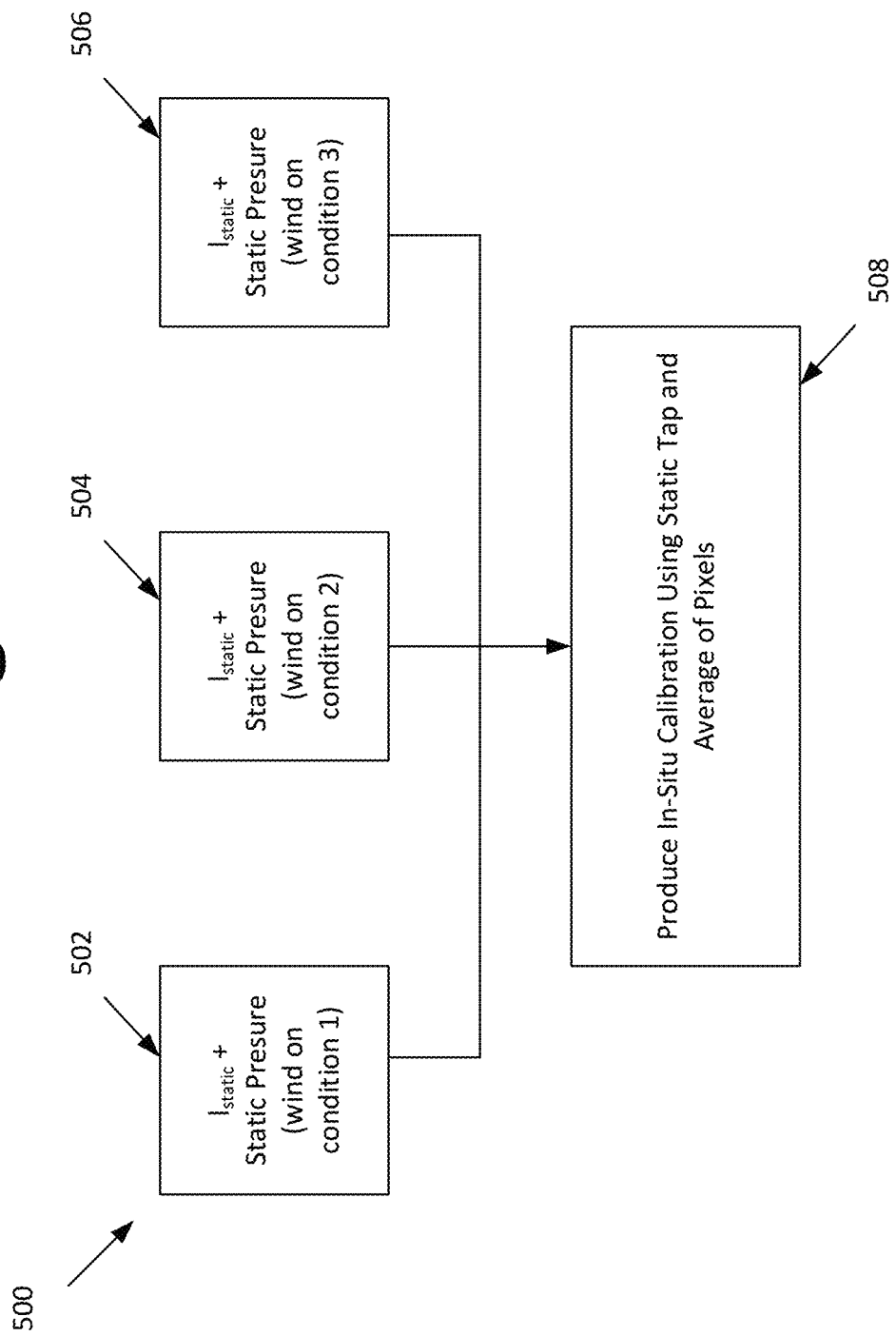
FIG. 5 is a flow diagram illustrating a method for producing in-situ calibration, according to some embodiments of the present invention.

At 304, using the average of pixels that were calculated in step 302 above, an in-situ calibration is produced. For example, FIG. 5 is a flow diagram illustrating a method 500 for producing in-situ calibration, according to an embodiment of the present invention. In some embodiments, method 500 may begin at 502 with the calculating the average of pixels (Istatic) plus a static pressure for wind tunnel condition 1. At 504, the average of pixels (Istatic) plus a static pressure for wind tunnel condition 2 is calculated, and at 506, the average of pixels (Istatic) plus a static pressure for wind tunnel condition 3 is calculated. Using these calculations, at 508, the in-situ calibration is produced.

Figure 6:
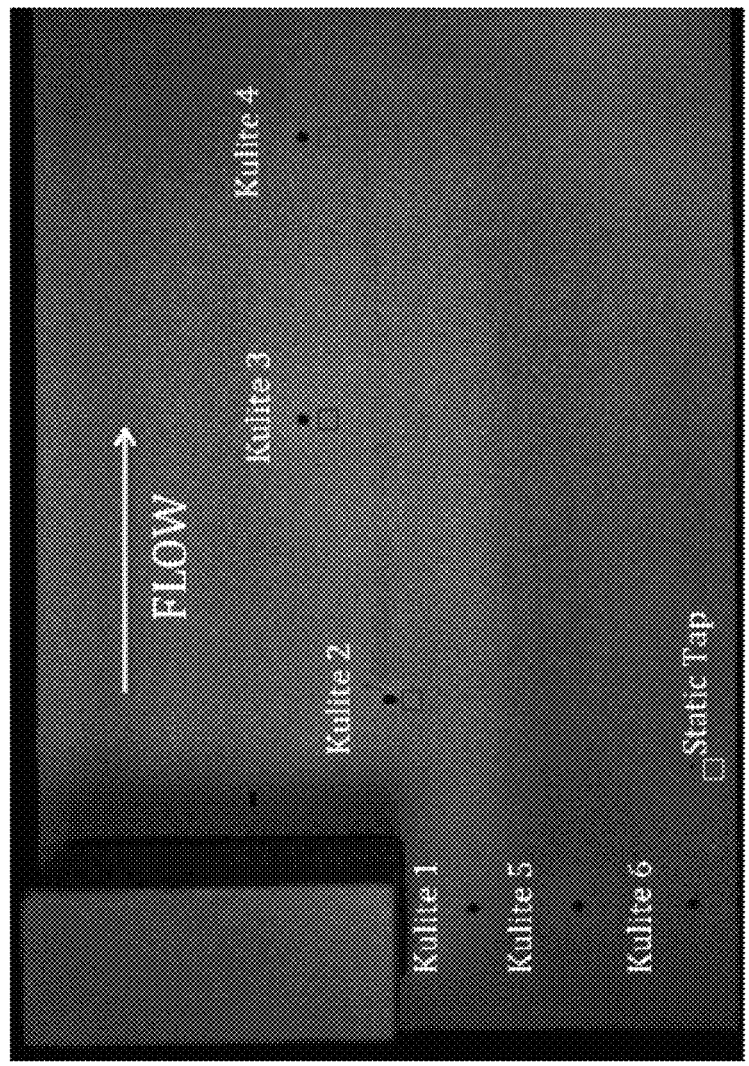
FIG. 6 is a raw image illustrating regions of interest by (or next to) each Kulite, where the PSP signal will be compared against the Kulite signal, according to some embodiments of the present invention.

FIG. 6 is a raw image 600 highlighting regions of interest by (or next to) each Kulite, where the PSP signal will be compared against the Kulite signal, according to an embodiment of the present invention. The block is located on the upper left hand side with the direction of the wind flow from left to right. The location of six unsteady pressure transducers, Kulite 1-Kulite 6, are indicated by the small black circles. See, for example, FIG. 2. Next to each pressure transducer and the static tap, a box has been drawn to locate the region of interest by each sensor to be averaged, calculating an average intensity-time history for each region.

Figure 7:
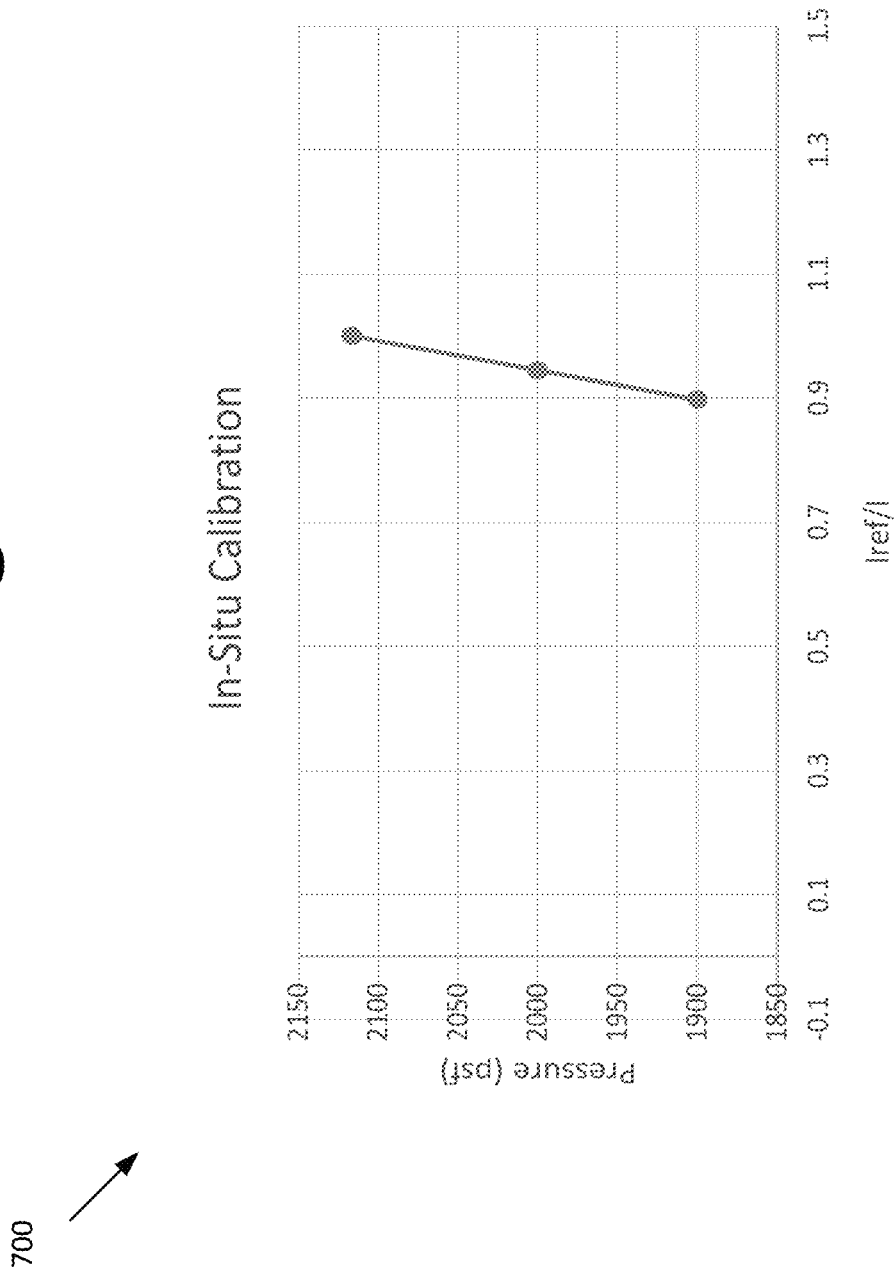
FIG. 7 is a graph illustrating the calibration used to convert ratioed intensity-time histories to pressure, according to some embodiments of the present invention.

FIG. 7 is a graph 700 illustrating the calibration used to convert ratioed intensity-time histories to pressure, according to an embodiment of the present invention. The y-axis represents the Iref/I ratioed value. Assuming that there is no temperature sensitivity, a value of the Iref/I ratio can be equated to a given pressure (pounds per square foot, psf) shown on the x-axis.

Figure 11:
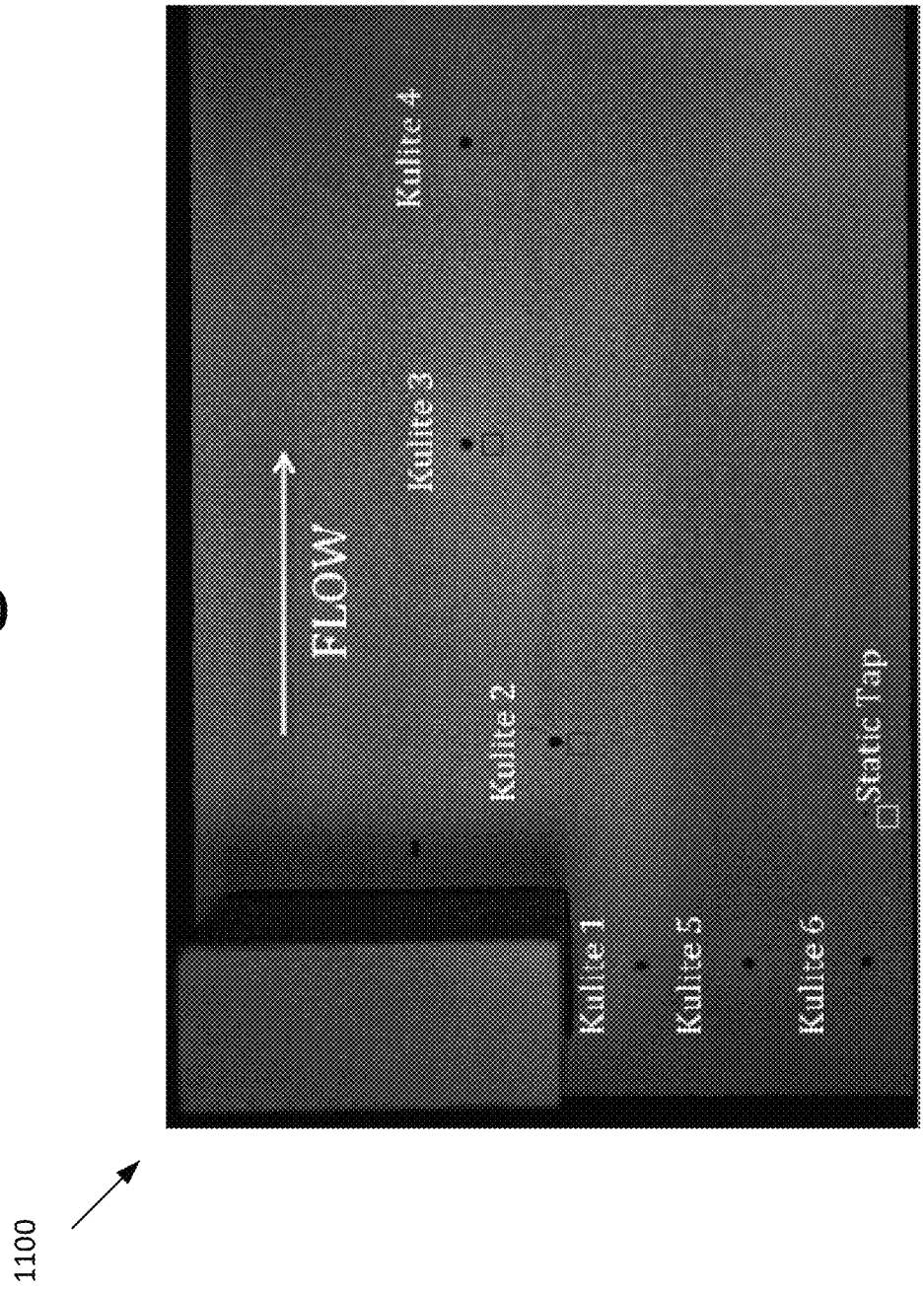
FIG. 11 is an image illustrating multiple regions of interest $ROI_1 \ldots ROI_{15}$, according to some embodiments of the present invention.

Returning to FIG. 3, at 306, the intensity time history for each region of interest ($ROI_1 \ldots ROI_{15}$) is calculated using the following equation.

$$I(t) = \sum_{p=1}^{m} I_p(ROI_q) \qquad \text{Equation (2)}$$

where I is the intensity in relation to time t, and q is the region of interest number. FIG. 11 is an image 1100 illustrating multiple regions of interest $ROI_1 \ldots ROI_{15}$, according to an embodiment of the present invention. Each box highlights a region of interest ($ROI_1 \ldots ROI_{15}$). The pixels within each $ROI_1 \ldots ROI_{15}$ will be averaged in space and time and converted to pressure using the in-situ calibration.

Returning to FIG. 3, at 308, the average static pressure in each region of interest (ROI) is calculated by taking the average of intensity time history I(t) for each region of interest (ROI), which was derived from step 306.

$$I_{average(ROIx)} = \sum_{t=1}^{n} I(\text{time}) \qquad \text{Equation (3)}$$

Figure 9:
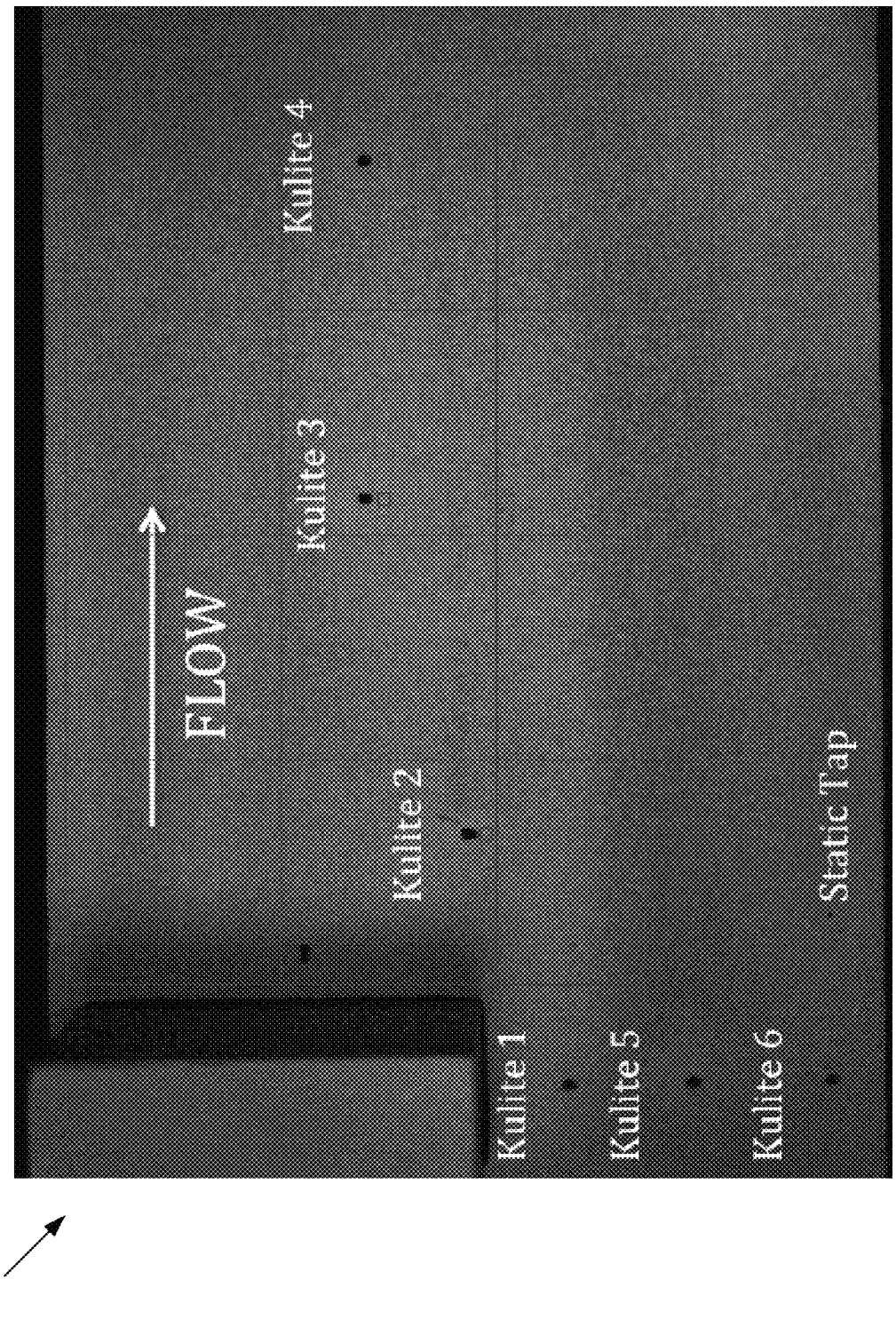
FIG. 9 is a raw image illustrating a block located in the upper left hand side with the direction of the wind flow from left to right, according to some embodiments of the present invention.

FIG. 9 is a raw image illustrating a block located in the upper left hand side with the direction of the wind flow from left to right, according to an embodiment of the present invention. In image 900, each square indicates a region of interest, where pixel values are averaged in space and time. In this embodiment, each square mark regions of interest near each Kulite and downstream of the block, where the PSP signal is averaged to produce average pressure-time signal in each region.

At 310, the average static pressure ($I_{ref}$) is divided by the calculated intensity I(t) for each region of interest (ROI) in terms of time, I(t), to produce a ratioed intensity measuring the intensity fluctuation. This fluctuation may be in response to small changes in pressure as the flow moves around the block. The $I_{ref}/I$ value and the in-situ calibration may be used to convert the intensity signal to a pressure signal.

Figure 8:
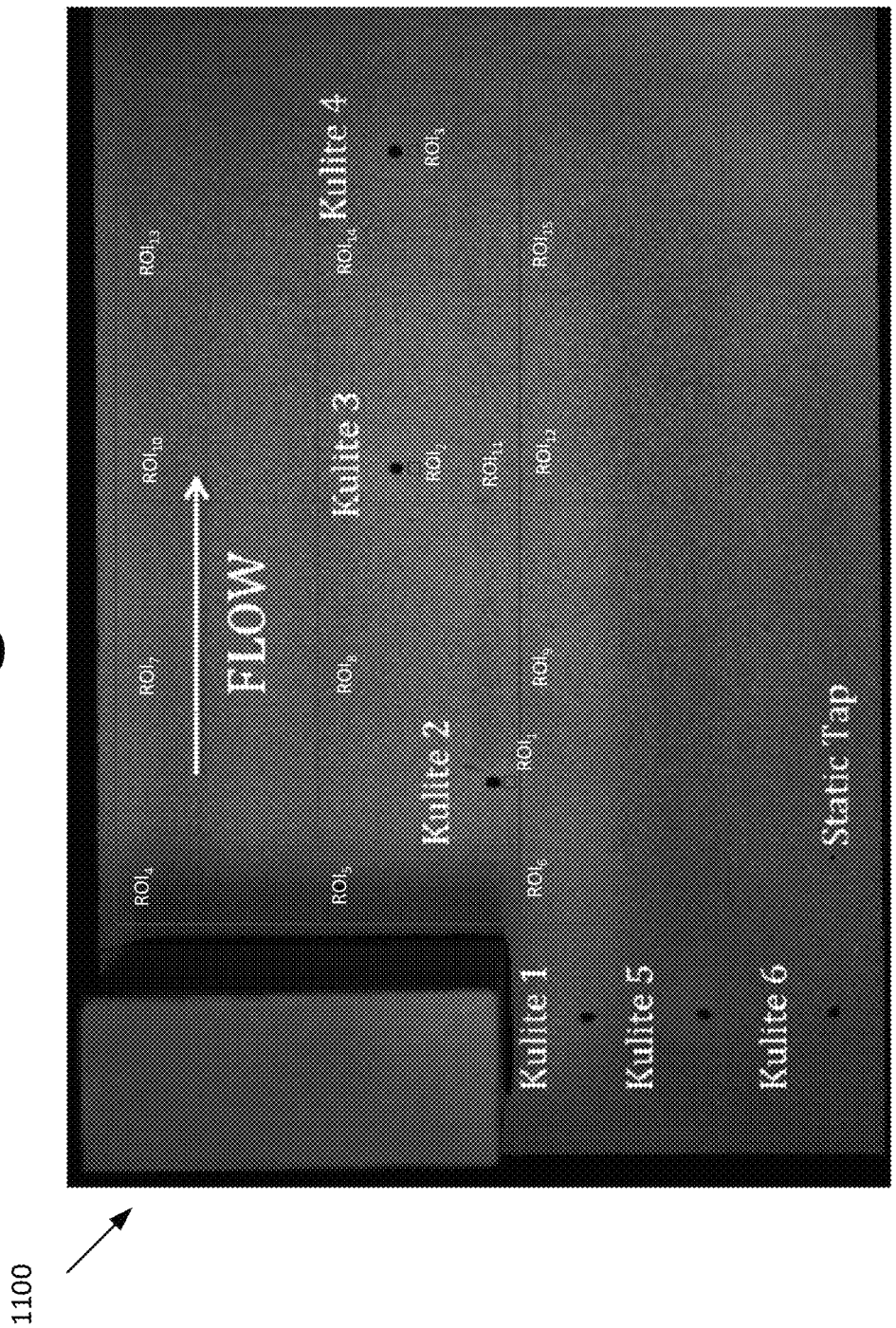
FIG. 8 is a raw image highlighting regions of interest $ROI_1$, $ROI_2$, and $ROI_3$, according to some embodiments of the present invention.
Figure 10:
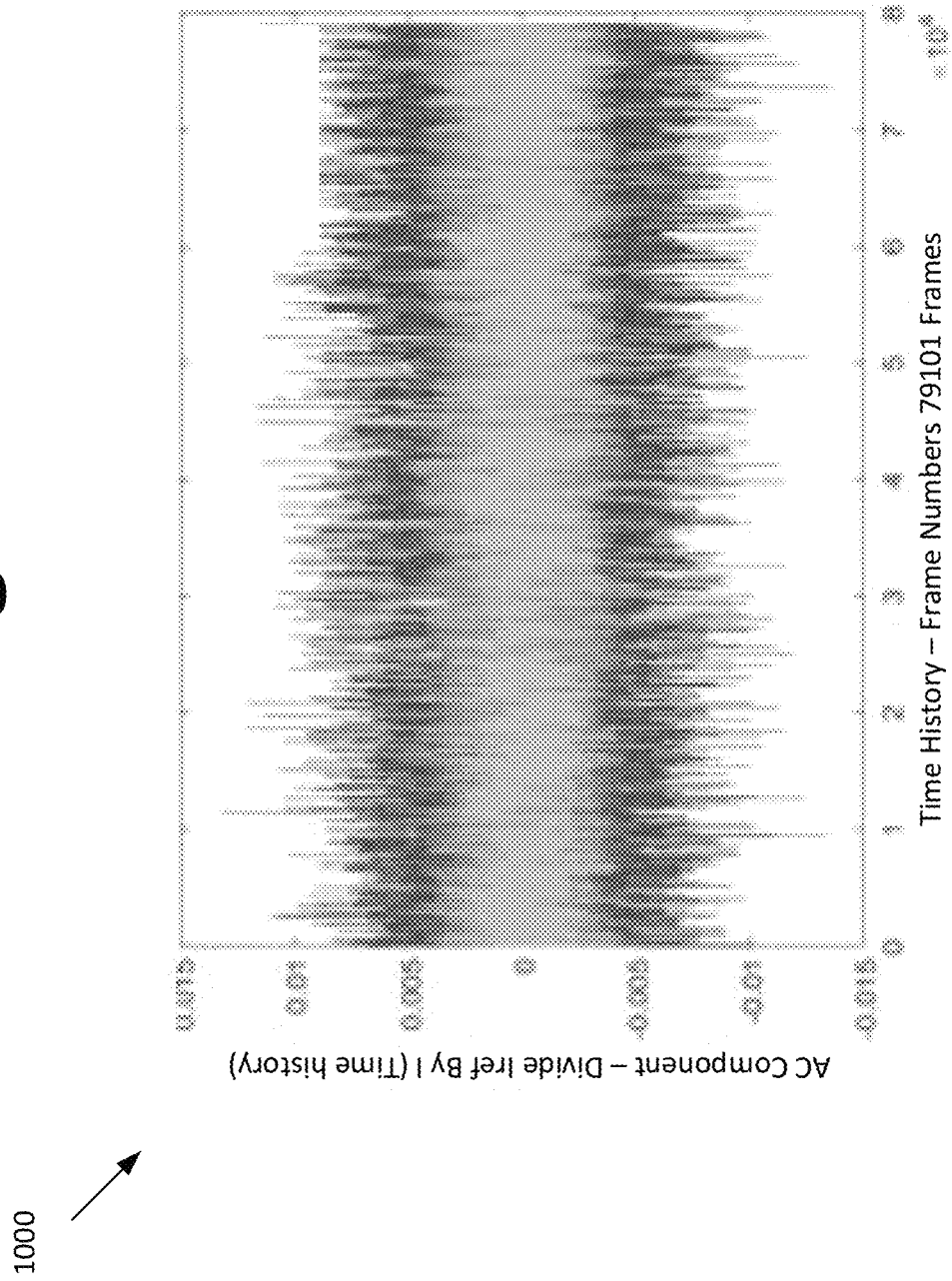
FIG. 10 is a graph illustrating a pressure time history (psf), according to some embodiments of the present invention.

At 312, assuming that there is no variation in temperature, the in-situ calibration derived in step 604 and the calculation performed above in step 310 are used to produce a pressure-time history (psf). FIG. 10 is a graph 1000 illustrating a pressure time history (psf), according to an embodiment of the present invention. In FIG. 10, the three values plotted are for the Regions of Interest ($ROI_1$, $ROI_2$, $ROI_3$—shown in FIG. 8). The values are ($I_{ref}/I-1$) to show relative magnitude of each signal to the others. The fluctuations indicate the change in pressure forcing a change in intensity in the paint, which is recorded by the cameras.

At 314, the fluctuating force is calculated by multiplying the produced pressure-time history (psf) by the area of pixels in each region of interest (ROI). Continuing with the examples provided herein, force in the x- and y-directions are assumed to be zero. See equations below.

$$F(x)=0 \qquad \text{Equation (4)}$$

$$F(y)=0 \qquad \text{Equation (5)}$$

$$F(z)i=A(ROI_q)*P(t) \qquad \text{Equation (6)}$$

Since the fundamental experiment is simple, the forces downstream (in the x-direction) and forces side to side (in the y-direction) can be assumed to be zero in Equations (4) and (5). The forces are assumed to only act in the z-direction (in and out of the page) and are defined by Equation (6).

Figure 12:
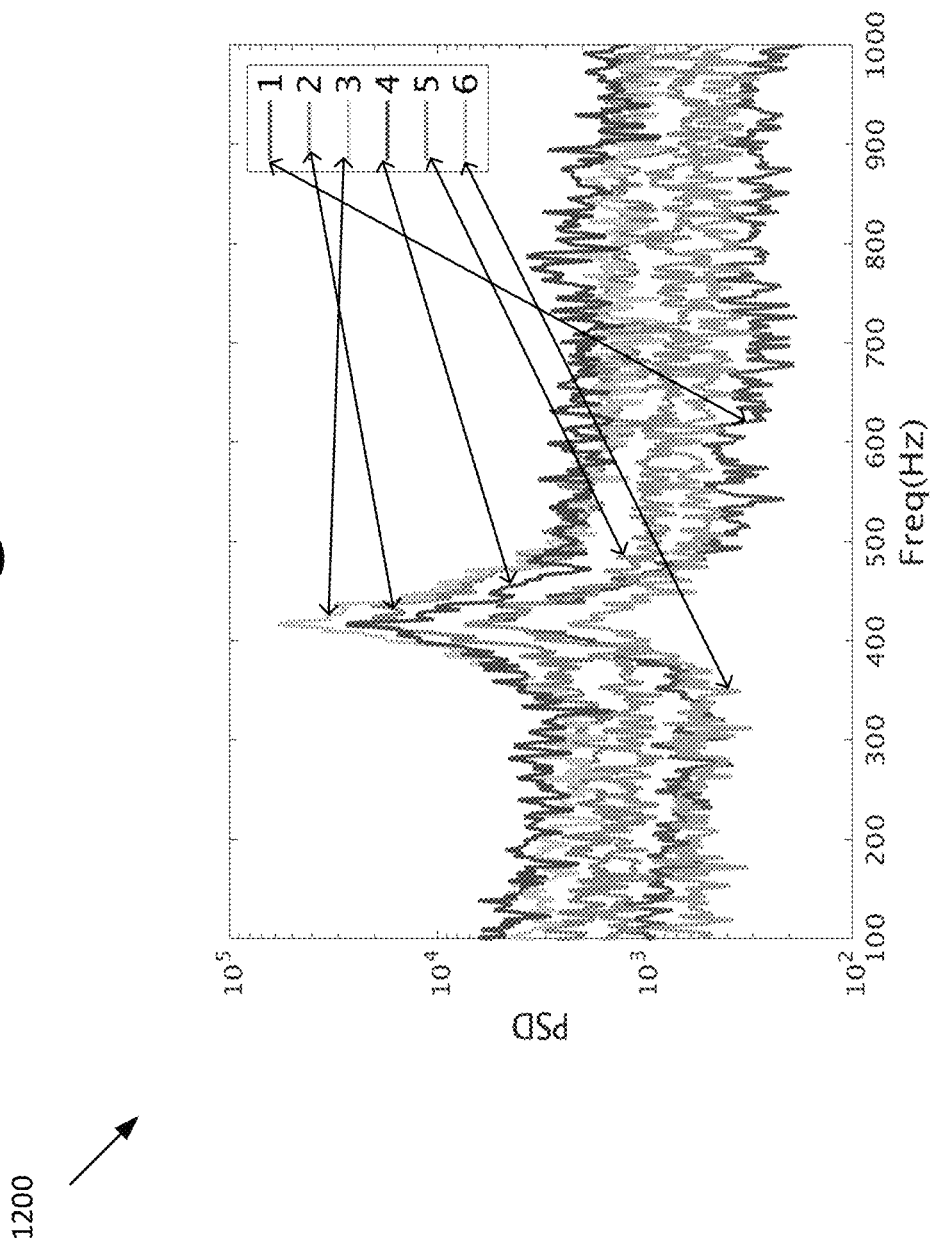
FIG. 12 is a graph illustrating a known frequency around a cube at a given velocity, according to some embodiments of the present invention.

At 316, using the pressure-time history at each region of interest (ROI) near each 'Kulite' (Kulite 1 to Kulite 6) in image 1100 of FIG. 11, the time signal is converted to frequency, and a power spectral density (PSD) is produced to compare frequency content to determine an amount of energy at a certain frequency band. For example, Strouhal shedding frequency was expected to be ~400 Hz, which highlights this model 1200 of FIG. 12 that was chosen to produce a known frequency around a cube at a given velocity.

FIG. 13 is a flow diagram illustrating a method 1300 to investigate the fundamental application of uPSP, according to an embodiment of the present invention. In some embodiments, method 1300 begins at 1302 with performing an in-situ calibration using the calculated average of pixels. At 1304, raw data (or intensity-time histories) are collected, and at 1306, calibrations are applied. Also, intensity time histories are converted to pressure-time history. At 1308, a force time history is produced by dividing pressure-time history by area.

FIG. 14 is a block diagram illustrating an apparatus 1400 for investigating a fundamental application of uPSP, according to an embodiment of the present invention. In some embodiments, apparatus 1400 includes at least one processor 1402 and memory 1404. In some embodiments, apparatus 1400 is a computing system. Memory 1404 includes a set of instructions that when executed cause at least one processor 1402 to perform the methods 300 and 1300 of FIGS. 300 and 1300, respectively.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, or a stand-alone device. The process can be implemented as instructions executed by such hardware, hardware alone, or any combination thereof. The software may be stored on a program storage device readable by a machine.

In addition, those of ordinary skill in the art will recognize that devices of a less general purpose nature, such as hardwired devices, field programmable logic devices (FPLDs), including field programmable gate arrays (FPGAs) and complex programmable logic devices (CPLDs), application specific integrated circuits (ASICs), or the like, may also be used without departing from the scope and spirit of the inventive concepts disclosed herein.

In accordance with one embodiment of the present invention, the method may be implemented on a data processing computer such as a personal computer, workstation computer, mainframe computer, or high performance server running an OS such as Solaris® available from Oracle Corporation of Redwood City, Calif., Microsoft® Windows®, available from Microsoft Corporation of Redmond, Wash., various versions of the Unix operating system such as Linux available from a number of vendors, various embedded operating systems, or various mobile operating systems. The method may also be implemented on a multiple-processor system, or in a computing environment including various peripherals such as input devices, output devices, displays, pointing devices, memories, storage devices, media interfaces for transferring data to and from the processor(s), and the like.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

What is claimed is:

1. A method for measuring and computing unsteady loads using unsteady pressure-sensitive paint (uPSP) data, comprising:
    performing, by a computing system, an in-situ calibration using an average of pixels of a portion of an image captured of a surface painted with pressure-sensitive paint;
    dividing, by the computing system, an average static pressure by an intensity for each region of interest (ROI) in the image in terms of time to produce a ratioed intensity measuring an intensity fluctuation; and
    producing, by the computing system, a pressure-time history from the in-situ calibration and the measured intensity fluctuation;
    calculating, by the computing system, a fluctuating force by multiplying the produced pressure-time history by an area of pixels in each ROI;
    converting, by the computing system, a time signal to a frequency;
    producing a power spectral density (PSD) to compare frequency content to determine an amount of energy at a certain frequency band; and
    calculating an intensity time history for each ROI,
    wherein the calculating of the intensity time history for each ROI is performed by $$I(t) = \sum_{p=1}^{m} I_p(ROI_q)$$

where I is an intensity in relation to time t, q is a region of interest number, p is a pixel number, and m is total number of pixels averaged.

2. The method of claim 1, further comprising:
    calculating the average of pixels in space and time at a location near a static tap.

3. The method of claim 2, wherein the performing of the in-situ calibration comprises
    producing an in-situ calibration by
        calculating the average of pixels and a static pressure for two or more wind tunnel conditions.

4. The method of claim 1, further comprising:
    calculating the average static pressure in each ROI by taking an average of the intensity time history for each ROI.

5. The method of claim 4, wherein the calculating of the average static pressure is derived from $$I_{average(ROIx)} = \sum_{t=1}^{n} I(\text{time})$$

where I is an intensity in relation to time t, and x is a number for a particular ROI.

6. The method of claim 1, wherein the intensity fluctuation and the in-situ calibration are used to convert an intensity signal to a pressure signal.

7. An apparatus for measuring and computing unsteady loads using unsteady pressure-sensitive paint (uPSP) data, the apparatus comprising:
    at least one processor; and
    memory comprising a set of instructions, wherein
    the at least one processor, when executed by the set of instructions, are configured to perform
        in-situ calibrating using an average of pixels of an image captured of a surface painted with pressure-sensitive paint
        dividing an average static pressure by an intensity for each region of interest (ROI) in the image in terms of time to produce a ratioed intensity measuring an intensity fluctuation; and
        producing a pressure-time history from the in-situ calibration and the measured intensity fluctuation;
        calculating a fluctuating force by multiplying the produced pressure-time history by an area of pixels in each ROI;
        converting a time signal to a frequency;
    producing a power spectral density (PSD) to compare frequency content to determine an amount of energy at a certain frequency band; and
    calculating an intensity time history for each ROI,
    wherein the calculating of the intensity time history for each ROI is performed by $$I(t) = \sum_{p=1}^{m} I_p(ROI_q)$$

where I is an intensity in relation to time t, q is a region of interest number, p is a pixel number, and m is total number of pixels averaged.

8. The apparatus of claim 7, wherein the at least one processor, when executed by the set of instructions, are further configured to perform calculating the average of pixels in space and time at a location near a static tap.

9. The apparatus of claim 7, wherein the at least one processor, when executed by the set of instructions, are further configured to perform
    producing an in-situ calibration by
        calculating the average of pixels and a static pressure for two or more wind tunnel conditions.

10. The apparatus of claim 7, wherein the at least one processor, when executed by the set of instructions, are further configured to perform
    calculating the average static pressure in each ROI by taking an average of the intensity time history for each ROI.

11. The apparatus of claim 10, wherein the calculating of the average static pressure is derived from $$I_{average(ROIx)} = \sum_{t=1}^{n} I(\text{time})$$

where I is an intensity in relation to time t, and x is a number for a particular ROI.

12. The apparatus of claim 7, wherein the intensity fluctuation and the in-situ calibration are used to convert an intensity signal to a pressure signal.

13. A method for measuring and computing unsteady loads using unsteady pressure-sensitive paint (uPSP) data, comprising:
  calculating, by a computing system, an average of pixels in space and time of a portion of an image captured of a surface painted with pressure-sensitive paint at a location near a static tap;
  performing, by a computing system, an in-situ calibration using the average of pixels of the portion of the image;
  dividing, by the computing system, an average static pressure by an intensity for each region of interest (ROI) in the image in terms of time to produce a ratioed intensity measuring an intensity fluctuation; and
  producing, by the computing system, a pressure-time history from the in-situ calibration and the measured intensity fluctuation;
  calculating, by the computing system, a fluctuating force by multiplying the produced pressure-time history by an area of pixels in each ROI;
  converting, by the computing system, a time signal to a frequency;
  producing a power spectral density (PSD) to compare frequency content to determine an amount of energy at a certain frequency band;
  calculating an intensity time history for each ROI,
  wherein the calculating of the intensity time history for each ROI is performed by $$I(t) = \sum_{p=1}^{m} I_p(ROI_q)$$

where I is an intensity in relation to time t, q is a region of interest number, p is a pixel number, and m is total number of pixels averaged.

14. The method of claim 13, wherein the performing of the in-situ calibration comprises
  producing an in-situ calibration by
    calculating the average of pixels and a static pressure for two or more wind tunnel conditions.

15. The method of claim 13, wherein the intensity fluctuation and the in-situ calibration are used to convert an intensity signal to a pressure signal.

* * * * *